United States Patent [19]

Janatka

[11] Patent Number: 5,052,842
[45] Date of Patent: Oct. 1, 1991

[54] SECURE LOCKING MEANS FOR MECHANICAL DRIVE COMPONENTS

[75] Inventor: Karel J. Janatka, Southbury, Conn.

[73] Assignee: Pitney Bowes Inc., Stamford, Conn.

[21] Appl. No.: 676,054

[22] Filed: Mar. 27, 1991

[51] Int. Cl.$^5$ .............................................. B25G 3/00
[52] U.S. Cl. ...................................... 403/14; 403/359; 403/290; 403/366
[58] Field of Search ............... 403/290, 289, 273, 344, 403/366, 359, 14

[56] References Cited

U.S. PATENT DOCUMENTS 3,473,202  10/1969  Howard .......................... 403/290 X
3,502,351   3/1970  Gray ............................... 403/373 X
4,619,548  10/1986  Kazaoka et al. ................ 403/359 X Primary Examiner—Andrew V. Kundrat
Attorney, Agent, or Firm—Charles R. Malandra, Jr.; David E. Pitchenik; Melvin J. Scolnick

[57] ABSTRACT

A device for securing a mechanical drive component to a drive shaft comprises a hub having an extended slotted member and a hub member. The hub member has a knurled surface for securing the hub to the drive component by pressed fit. A clamping collar is used for clamping the slotted member to the drive shaft. The slotted member of the hub includes a rib for aligning the slots in the slotted member relative to a split in the collar.

11 Claims, 2 Drawing Sheets

SECURE LOCKING MEANS FOR MECHANICAL DRIVE COMPONENTS

FIELD OF THE INVENTION

This invention relates to machines having mechanical drive components and more particularly to inserter machines where the rotary drive components are subject to high levels of repeated stop and go operation.

BACKGROUND OF THE INVENTION

It is known to assemble mechanical drives comprising a drive (or driven) shaft and rotatable parts or components which are subjected to repeated fluctuations in load. For example, inserter machines, such as the 8300 Inserter Series manufactured by the assignee of the present invention, include bursting and sheet feeding apparatus which continually operate in rapid stop and go, or deceleration and acceleration movement of the mechanical drives. A basic problem inherent with such operation is that over a period of operation the mechanical drive components wear and become loose on the shaft causing the components to slip and the operation to malfunction.

Various methods have been used to prevent the mechanical drive components, such as pulleys, sprockets or gears, from slipping on the drive shaft. One method that is well known is to secure the component to the drive shaft using a set screw passing through the component or through an extended portion of the hub of the component. The set screw is tightened against the drive shaft to lock the component in place. Variations of this method include the use of a "D" shaft whereby the screw is tightened against the flat portion of the shaft. Typically, the "D" hole of the component is sized and matched to the "D" shape of the shaft such that it just slips over the shaft. Although such methods are suitable for securing the components to the drive shaft, experience has shown that they do not prevent the assembled component from becoming loose on the shaft and moving from the prescribed lateral position. The continuous fluctuations in load, such as the stop and go movement caused by clutch and brake operation in a bursting apparatus, eventually causes the screw to loosen or the shaft to wear and eventually causes a failure in the apparatus. Another problem with tightening the set screw against the drive shaft is that the screw notches the drive shaft and the notches may restrict further adjustments to the location of the component on the drive shaft.

A more reliable method of securing a drive component to the drive shaft is positioning the component, such as a pulley, laterally on the drive shaft during assembly, drilling a tapered hole through the pulley and its hub and the drive shaft, and banging a tapered pin into the hole so that the component becomes integral with the drive shaft. This provides an assembly capable of handling repeated fluctuations in load. One disadvantage with this method is that it is not suitable for use with nonmetal components on machines having torque loads such as inserters. Another disadvantage of this method is that although it is more reliable for preventing a loosing of the component on the drive shaft, it is not suitable for after assembly adjustment or replacement of the component. Because the hole is drilled through the component and shaft at the same time during assembly, it is difficult to replace a worn component without replacing the shaft. Furthermore, this method does not leave room for error because once the hole is drilled into the drive shaft mistakes in the lateral positioning of a component on the shaft cannot easily be corrected. Any position adjustments may require replacement of the drive shaft.

Another problem in this area is that commercially manufactured drive components typically are manufactured with a round hole. When a the component is to be used on a "D" shaft, a special part must be ordered or a hub with a "D" hole must be inserted into a bored out hole in the component. Generally, the hubs which are suitable for use with metal components are not suitable for use with softer material such as urethane. Other methods of mounting drive components to hubs are known but require special assembling or tooling.

SUMMARY OF THE INVENTION

It has been discovered that mechanical drive components can be securely locked in place on a drive shaft by assembling the drive component to a knurled member of a hub having an extended slotted member which is secured to the shaft by a split collar clamp. It has further been discovered that adding a ribbed portion to engage the split portion of the split collar clamp assures the correct assembly of the collar to the hub. The rib aligns the slots in the hub to the split in the clamp which provides the maximum tightening of the hub on the shaft. It has been found that this significantly reduces the wear of the shaft which has previously been caused by repeated fluctuations of the load. The slotted member of the hub flexes as the split clamp is tightened until the drive component assembly is locked in place on the shaft.

It has further been found that the combination of a high density powder metal hub with a knurled member compressed into a hole bored into a commercial drive component, such as a timing pulley, and secured to the drive shaft with a split collar clamp mounted over a slotted member of the hub significantly increases the reliability for rotatable parts or components mounted on the shaft subjected to high levels of stop and go, or deceleration and acceleration operations.

In accordance with the present invention, a hub is used in conjunction with a split clamp to assemble drive components on a drive shaft subjected to high rates of stop and go operation. The hub with a "D" hole, orientation rib, and slots parallel in coincidence with the flat portion of the "D" hole enables clamping on the "D" drive shaft and the correct positioning of the split clamp to maximize the flexing and therefore the clamping on the split portion of the hub. A knurled member of the hub assures and permits assembly to all sorts of mechanical devices like timing pulleys, gears and sprockets, with positive interference and no slip between the hub and the component.

In an apparatus comprising mechanical drive components, such as timing pulleys and gears, and a shaft for rotatably driving the mechanical drive components, the improvement comprising a hub including a slotted member and a knurled member. The knurled member is secured in a hole of the mechanical drive component by pressed fit. The slotted member includes a rib for aligning the slots with a split portion of a clamp whereby the drive component is locked in place on the drive shaft when the clamp is tightened.

A device for securing a mechanical drive component to a drive shaft comprises a hub having an extended slotted member and a hub member. The hub member has a knurled surface for securing the hub to the drive component by pressed fit. There is a clamping collar for clamping the slotted member to the drive shaft. The slotted member of said hub includes a rib for keying and locking the hub in position relative to the collar.

BRIEF DESCRIPTION OF THE DRAWINGS

A complete understanding of the present invention may be obtained from the following detailed description of the preferred embodiment thereof when taken in conjunction with the accompanying drawings wherein like reference numerals designate similar elements in the various figures, and in which.

DETAILED DESCRIPTION OF THE PRESENT INVENTION

The Figures show the preferred embodiment of the present invention, in which a hub 10 and clamp collar 30 are used to secure a mechanical drive component, such as a commercial timing pulley 20 to a drive shaft 40.

Figure 1:
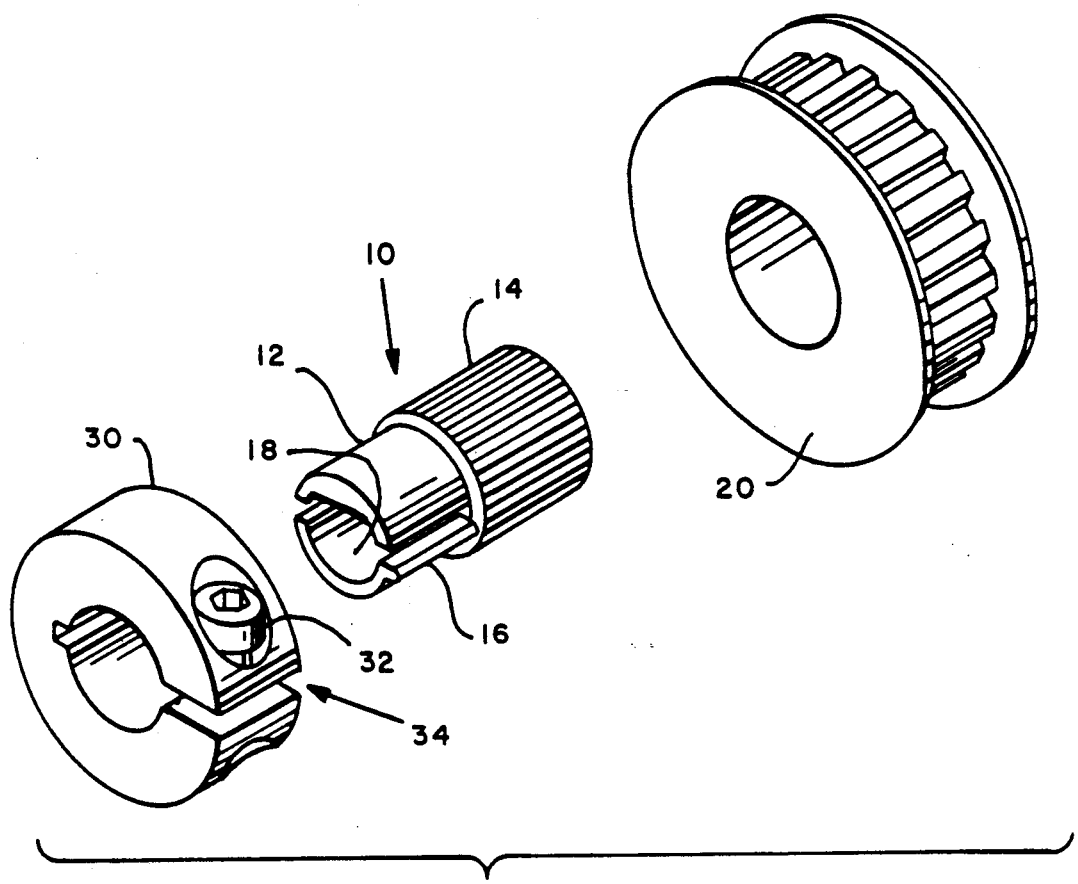
FIG. 1 is an exploded isometric view of a split collar clamp, a hub and a drive component which comprise an embodiment of the present invention.

FIG. 1 shows hub 10 which has an extended member 12 which is slotted and a hub member 14 which is knurled. Slotted member 12 includes a locator rib 16 situated at one of the slots. In the preferred embodiment of the present invention, hub 10 is a high density powder metal hub which has a D-shaped hole 18 for locking on to a "D" shaped portion 42 of drive shaft 40. Clamp collar 30 is split collar clamp which slides over the slotted member 12 of hub 10. Clamp collar 30 includes a set screw 32 which passes through a split portion 34 of clamp 30. Rib 16 of hub 10 engages the split portion 34 of collar 30 and in doing so maintains the orientation between collar 30 and hub 10 when set screw 32 is tightened.

It has been discovered that a hub having a slotted member with the locator rib and having a hole matching the shape of the shaft can be locked in place by a split collar clamp to significantly reduce the wear on the shaft typically experienced from repeated stop and go operation. It has been discovered that the present invention works for various shaped shafts including round shafts.

Figure 2:
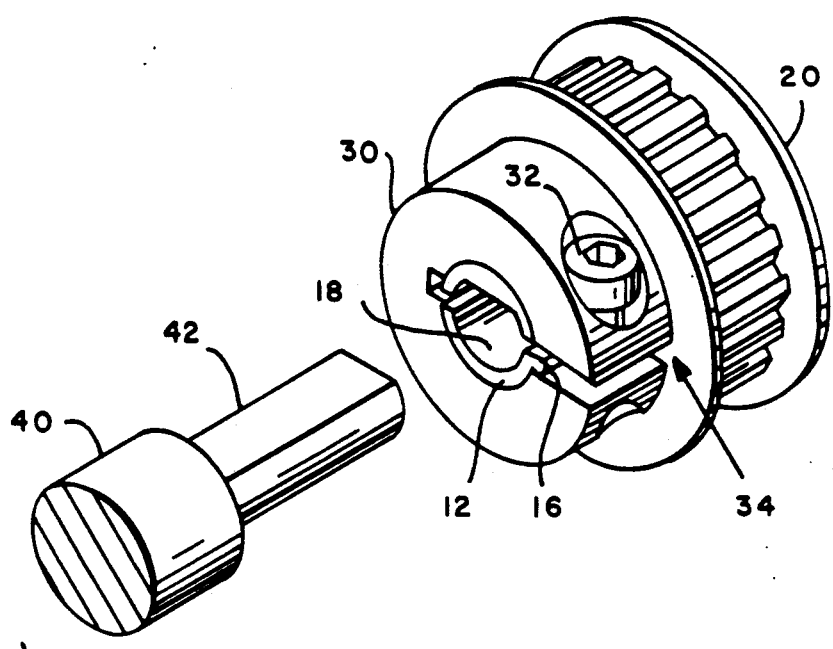
FIG. 2 is an isometric view of the clamp, hub and drive component of FIG. 1 assembled for mounting on a drive shaft.
Figure 3:
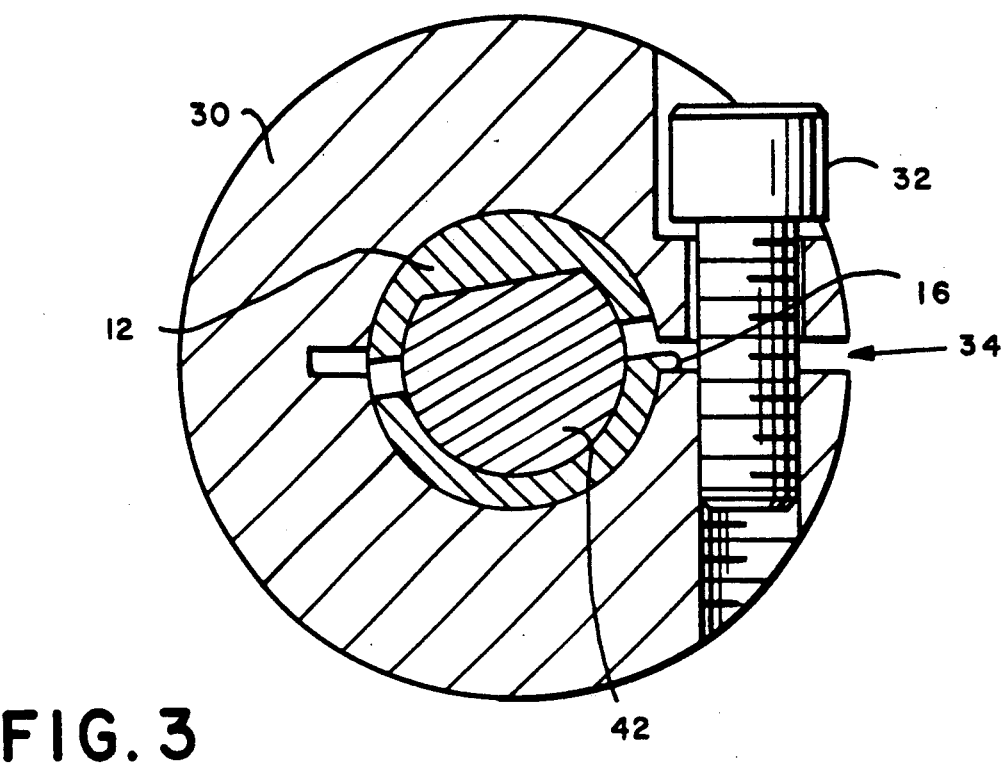
FIG. 3 is an end view of the device in FIG. 1 secured on the drive shaft.

Referring now to FIGS. 2 and 3, hub 10 has been inserted into the hole of pulley 20 and collar 30 has been placed over the slotted member 12 of hub 10. In the preferred embodiment of the present invention, pulley 20 is secured to knurled member 14 of hub 10 by interference or pressed fit. It has been found that the pressed fit between hub 10 and pulley 20 provides a more reliable fastening than the use of set screws which are known to become loose when subjected to repeated stop and go operation. It will be understood that alternate methods of coupling pulley 20 to hub 10 can also be use. For example, for components made of softer material, such as urethane, an epoxy can be added during the pressed fit to strengthen the bond between the two materials.

Any commercially available drive component can be used in conjunction with the present invention. A hole is bored into the drive component at a diameter slightly smaller than the outer diameter of the knurled member 14 of hub 10. In the preferred embodiment of the present invention, for a ⅜ inch diameter shaft the outer diameter of the knurled member is between 0.5675 to 0.5695 inches and the hole bored into the drive component is between 0.562 to 0.563 inches. The knurled member is then interference fit into the bored hole in the component.

It will be understood by those skilled in the art that the present invention is suitable for any mechanical drive component which is driven by a drive shaft. For example, hub 10 and collar 30 can be used to secure gears, sprockets or cams.

It has been found that the present invention provides an easy and reliable method of securing commercially availal 1 drive components, such as pulley 20, to drive shafts without having to mar the shaft by drilling into the shaft or tightening a set screw against the shaft. The present invention has been found to be particularly suitable for use in machines where the mechanical drive components are repeatedly subjected to fluctuations in load caused, for example, by continuous stop and go or deceleration and acceleration movement, such as the clutch and brake operation in an inserter machine. It has also been found that the present invention provides the added advantage of facilitating adjustments to the lateral positioning of the component on the drive shaft.

It will be appreciated by those skilled in the art that the terms "drive shaft" and "drive component", as used herein to describe the present invention, includes driven shafts and driven components.

Figure 4:
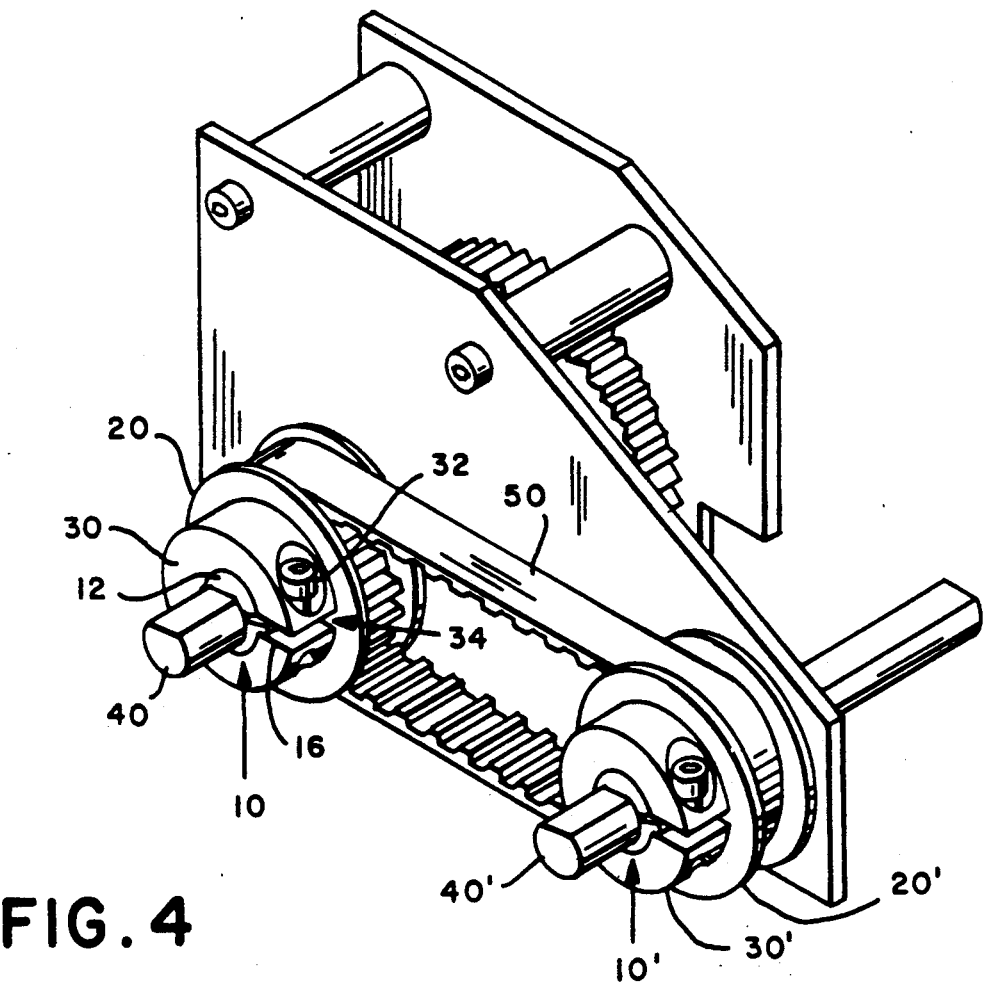
FIG. 4 is an isometric view of a typical application of the present invention.

Referring now to FIG. 4, a typical application of the present invention is shown. Timing pulley 20 is mounted on drive shaft 40 by hub 10 and clamp 30. Timing belt 50 operates in conjunction with timing pulley 20 to drive driven pulley 20' which is mounted on driven shaft 40' by hub 10' and collar 30'. Drive shaft 40 and driven shaft 40' may be used for driving rollers in a bursting apparatus.

It will be appreciated that there has been provided in accordance with the present invention a device for securely locking mechanical drive components to a drive shaft that fully satisfies the objects, aims and advantages set forth above. While this in this invention has been described in conjunction with specific embodiments thereof, many alternatives, modifications and variations will be apparent to those skilled in the art. Accordingly, it is intended to embrace all such alternatives, modifications and variations that follow within the spirit and scope of the appended claims.

What is claimed:

1. A device for securing a mechanical drive component to a drive shaft, comprising:
   a hub having a hub member and an extended slotted member, said hub member having a knurled surface for securing said hub to said drive component by interference fit, and said slotted member including a locator rib.

2. The device according to claim 1 further comprising a clamping collar for clamping said slotted member to the drive shaft, said locator rib aligning slots in said slotted member to a split portion in said clamping collar.

3. The device according to claim 2 wherein said clamping collar is a split collar clamp.

4. The device according to claim 2 wherein said hub is a high density powder metal hub.

5. The device according to claim 1 wherein the hub includes a D-shaped hole for engaging a D-shaped shaft.

6. The device according to claim 5 wherein the slotted member includes two slots opposite each other, said slots being parallel and coincident with the flat portion of the D-shaped hole of said hub.

7. In an apparatus comprising mechanical drive components, such as pulleys and gears, and a shaft for rotatably driving the mechanical drive components, the improvement comprising a hub including a slotted member and a knurled member, said slotted member having a locator rib for engaging a split portion of a clamp for aligning slots in said slotted member during assembly, and said knurled member being secured in a hole of the mechanical drive component.

8. The device according to claim 7 wherein said clamping means is a split collar clamp.

9. The device according to claim 7 wherein said hub is a high density powder metal hub.

10. The device according to claim 7 wherein the hub includes a D-shaped hole for engaging a D-shaped shaft.

11. The device according to claim 10 wherein the slotted member includes two slots opposite each other, said slots being parallel and coincident with the flat portion of the D-shaped hole of said hub.

* * * * *